No. 704,587. Patented July 15, 1902.
C. SHABLEY.
HARROW.
(Application filed Apr. 2, 1902.)
(No Model.)
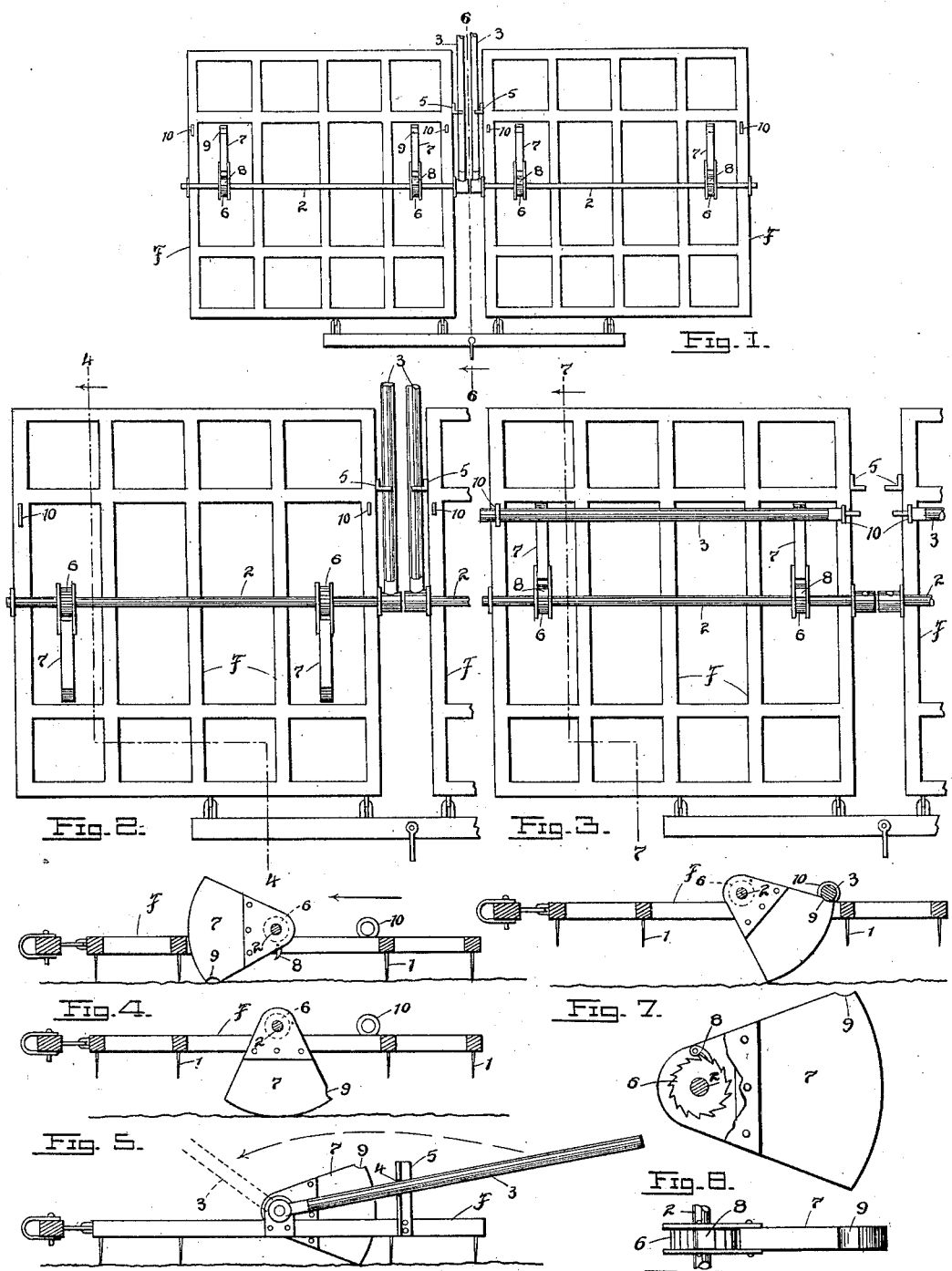
Witnesses
Inventor
Charles Shabley
By his Attorney

UNITED STATES PATENT OFFICE.

CHARLES SHABLEY, OF WESSINGTON SPRINGS, SOUTH DAKOTA.

HARROW.

SPECIFICATION forming part of Letters Patent No. 704,587, dated July 15, 1902.

Application filed April 2, 1902. Serial No. 101,097. (No model.)

*To all whom it may concern:*

Be it known that I, CHARLES SHABLEY, a citizen of the United States, residing at Wessington Springs, in the county of Jerauld and State of South Dakota, have invented certain new and useful Improvements in Harrows, of which the following is a full, clear, and exact description, reference being had to the accompanying drawings, forming a part hereof.

My invention has relation to improvements in harrows; and it consists in the novel arrangement and combination of parts more fully set forth in the specification and pointed out in the claims.

In the drawings, Figure 1 is a top plan of a double harrow, showing the elevating-shoes in their normal position. Fig. 2 is a plan showing the shoes swung forward. Fig. 3 is a plan showing the shoes locked in a depressed position below the harrow-frame. Fig. 4 is a vertical section on line 4 4 of Fig. 2. Fig. 5 is a similar section showing the harrow advanced sufficiently forward to bring the rounded edges of the shoes in contact with the ground, the harrow being correspondingly elevated. Fig. 6 is a vertical section on line 6 6 of Fig. 1. Fig. 7 is a vertical section on line 7 7 of Fig. 3. Fig. 8 is a side elevation of the shoe with wall broken away to show the pawl and ratchet, and Fig. 9 is a top edge view of Fig. 8.

The object of my invention is to provide the ordinary harrow with an attachment which will enable the operator to elevate the harrow sufficiently to release the teeth thereof from any rubbish, leaves, and the like which may accumulate thereon from time to time as the harrow is dragged over the field.

A further object is to provide means for disengaging the teeth from the ground when the necessity for their operation does not arise.

In detail the invention may be described as follows:

Referring to the drawings, F F represent the frames of a double harrow, and 1 represents the teeth thereof. Mounted transversely on each frame is a rotatable rod 2, which may be rocked in its bearings by means of a detachable lever 3, normally held in position by inserting one end into a socket formed at the inner end of the rod, the lever being supported at an intermediate point in a notch 4, formed in a bracket 5, projecting from the frame. Disposed along the rod 2 are a series of ratchet-disks 6, secured rigidly to the rod and capable of oscillation therewith, each ratchet-disk being spanned by the forked end of a segmental shoe 7, adapted to freely swing about the rod, there being mounted within the fork a pawl 8, adapted to engage the teeth of the ratchet-disk when the rod is rocked in one direction. Under ordinary circumstances the edges of the curved ends or bases of the shoes are drawn along the ground over which the harrow passes, Figs. 1, 6; but when the teeth of the latter have gathered a sufficient quantity of rubbish—such as leaves, twigs, and the like—the operator swings the lever 3 forward, (see dotted position, Fig. 6,) thereby rocking the rod 2 in its bearings, the oscillation imparted thereto causing the ratchet-disks to engage the pawls, thereby swinging the shoes to the opposite ends of their curved edges, Fig. 4. As the harrow is drawn along (see arrow, Fig. 4) the advancing edges of the shoes will grip the soil and the frame will swing about the shoes, causing the latter to rock over the ground about their curved edges, thereby elevating the frame and teeth thereof sufficiently to permit such accumulated rubbish to disengage itself, Fig. 5. Upon a further advance of the harrow in the same direction the shoes resume their normal position, Fig. 6.

The upper edge of each shoe has formed thereon, at a point adjacent to its junction with the curved edge, a groove or depression 9. The frame, too, is provided with a series of eyes or loops 10, so disposed that in the event the lever 3 or any other bar of like construction (not shown) is passed through said loops it will rest in the grooves 9 if the shoes are sufficiently depressed below the frame (or what amounts to the same thing, if the frame is sufficiently raised to allow the shoes to drop below the frame,) as seen in Fig. 7. The levers or similar bars thus held in the loops effectively lock the shoes below the frame, and thus permit the latter to be drawn over the ground without permitting the teeth to touch the earth. Under the circumstances the harrow can be dragged along on its shoes in case it is not desirable to harrow the ground passed over.

It is of course apparent that once the shoes are swung around to the position where the curved edge becomes the advancing edge, Fig. 4, the pawls will for the time being become disengaged from the ratchets, only to fall into reëngagement the moment the shoes have resumed their normal position.

It is of course apparent that I may depart in a measure from the details here shown without affecting the spirit or nature of my invention.

Having described my invention, what I claim is—

1. A harrow comprising a frame, teeth carried thereby, a rotatable rod mounted on the frame, a series of ratchet-disks on said rod, a series of shoes mounted loosely on said rod adjacent to the ratchet-disks, a pawl carried by each shoe adapted to engage the ratchet-disks, means for rocking the rod and simultaneously swinging the shoes to bring the bases thereof to advance with the harrow, and cause the same to roll along the ground and elevate the frame, substantially as set forth.

2. In a harrow, a shoe having one end pivotally suspended to the harrow-frame, a curved base for the shoe, a depression formed along the upper edge of the shoe at a point contiguous with its junction with the curved base, and locking devices carried by the frame for engaging said depressions and locking the shoes, substantially as set forth.

3. In a harrow, a frame, a swinging shoe adapted to be depressed below the frame, a series of loops carried by the frame, and a bar passed through said loops and held against the shoes while in their depressed position, substantially as set forth.

In testimony whereof I affix my signature in presence of two witnesses.

CHARLES SHABLEY.

Witnesses:
EMIL STAREK,
G. L. BELFRY.